United States Patent [19]
Johnson

[11] Patent Number: 5,233,747
[45] Date of Patent: Aug. 10, 1993

[54] NUTCRACKER

[76] Inventor: Paul E. Johnson, 1115 Main St., Springfield, Oreg. 97477

[21] Appl. No.: 921,570

[22] Filed: Jul. 30, 1992

[51] Int. Cl.⁵ ............................................. B26B 17/00
[52] U.S. Cl. ................................. 30/120.2; 30/120.1; 99/568; D7/680
[58] Field of Search ......................... 30/120.2, 120.1; D7/680; 99/568

[56] References Cited

U.S. PATENT DOCUMENTS

| | | | |
|---|---|---|---|
| D. 282,076 | 1/1986 | Taylor | D7/680 |
| 1,357,472 | 11/1920 | Randall | 99/568 |
| 1,883,529 | 10/1932 | Buckwalter | 30/120.3 |
| 2,377,369 | 6/1945 | Potter | 30/120.2 |
| 2,378,084 | 6/1945 | Jackson | 30/120.3 |
| 4,520,719 | 6/1985 | Price | 30/120.2 |
| 4,944,091 | 7/1990 | Johnson | 30/120.2 |

FOREIGN PATENT DOCUMENTS 232827  5/1959  Australia ............................ 30/120.3

*Primary Examiner*—Frank T. Yost
*Assistant Examiner*—Hwei-Siu Payer
*Attorney, Agent, or Firm*—James D. Givnan, Jr.

[57] ABSTRACT

A manually operated nutcracking device with a threaded member for urging a carrier and a wedge thereon into nut engagement to split the nut. A base includes a pair of guides and a nut supporting surface. The carrier includes plate components coupled to the wedge in a detachable manner. The plate components are recessed to engage the inner edges of the pair of guides. A foot on the threaded member imparts travel to the carrier. The nut supporting surface area on the base has convergent surfaces for retention of a nut during cracking. Concave surfaces formed in the convergent surfaces are for retention of a nut with a circular shell.

1 Claim, 1 Drawing Sheet

NUTCRACKER

BACKGROUND OF THE INVENTION

The present invention pertains generally to hand operated devices for the cracking of nuts.

U.S. Pat. No. 4,944,091 issued to the present inventor discloses a nutcracker having a slidably mounted wedge acting on a nut supported by a surface of the nutcracker frame. While such a device is a signicant improvement over prior art nutcrackers, an improvement renders the device more practical.

SUMMARY OF THE PRESENT INVENTION

The present invention is embodied within a nutcracker adapted for the cracking of a wide variety of nuts of different shapes and sizes.

The base of the present nutcracker includes a shaped or contoured surface for the retention of various species of nuts including almonds, pecans, walnuts, brazils and macadamia nuts. Generally speaking, spheroidal shaped nuts as for example filbert and macadamia nuts are supported in place by a pair of concave surfaces formed on the nutcracker base or frame while other nuts of cylindrical configuration, such as almonds, pecans, are supported on downwardly converging surfaces forming a grooved portion of the frame.

Important features of the present nutcracker include the provision of a nut supporting surface on a nutcracking device adapted to retain in place the nut being cracked as a wedge penetrates the shell of the nut; the provision of a nut supporting surface shaped to retain a wide variety of nut shapes and sizes in place during cracking.

DETAILED DESCRIPTION OF THE PREFERRED EMBODIMENTS

Figure 1:
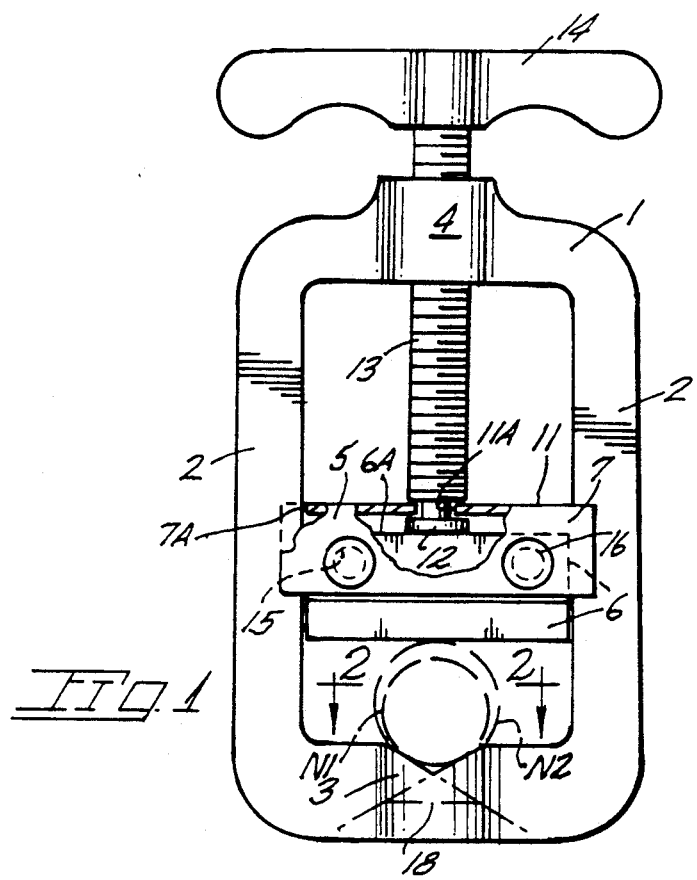
FIG. 1 is a front elevational view of the present nutcracker.

With continuing attention to the drawings wherein applied reference numerals indicate parts hereinafter similarly identified, the reference numeral 1 indicates a base of the present device which is similar to that shown and described in U.S. Pat. No. 4,944,091 noted above.

The base includes a frame structure having parallel guides 2, a nut support 3 and an internally threaded boss at 4.

The guides 2 on the base serve to receive a carrier 5 for a wedge 6 for splitting a shell on nut support 3. Said carrier may be formed of metal plate components 7 each with shoulders at 7A for sliding entrainment on the inner edges of guides 2. The plate components 7 are of right angular shape each having an uppermost flange 11 recessed at 11A.

A threaded shaft 13 in boss 4 is provided with a handle 14 for imparting rectilinear travel to wedge 6 held in carrier 5 by fasteners 16. A foot 12 on the lower end of a threaded shaft 13 bears upon the top edge 6A of wedge 6. The wedge is retracted along the base guides 2 by connector foot 12 engaging the underside of the carrier flanges 11. The fastener assemblies 16 extend through the carrier plate components and through a pair of bores 15 in wedge 6. Fastener assembly removal permits wedge substitution if so desired.

Figure 2:
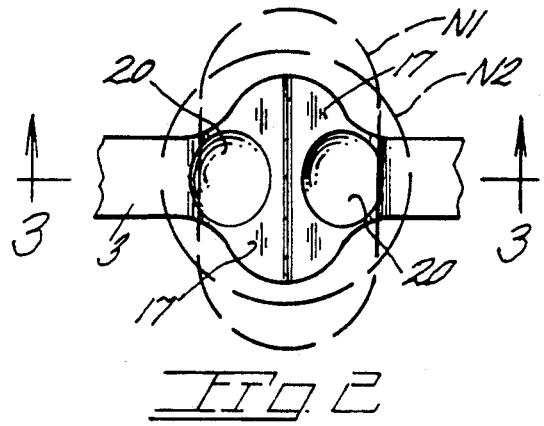
FIG. 2 is a horizontal view taken along line 2—2 of FIG. 1.
Figure 3:
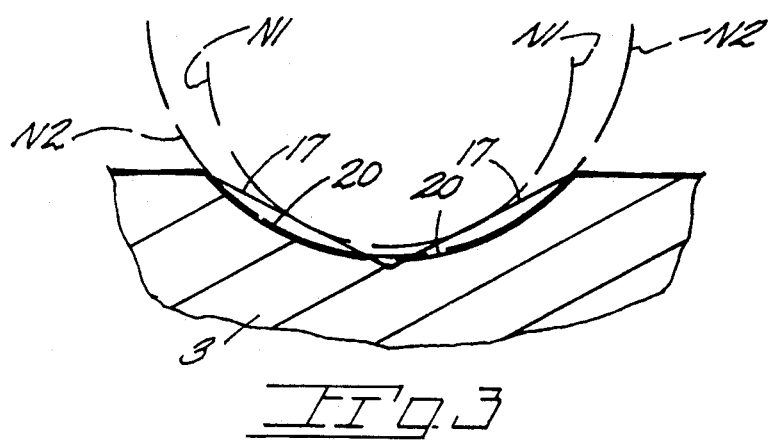
FIG. 3 is an enlarged sectional view taken along line 3—3 of FIG. 2.

The present nut support as best shown in FIGS. 2 and 3 includes surfaces at 17 which are downwardly convergent and define an included angle 18 of approximately 130 degrees. The surfaces 17 each have a concave area 20 formed therein. Accordingly the nut support has pairs of nut supporting surfaces at 17 and 20 for the respective support of both cylindrical as well as spherical shaped nuts N1 and N2 to confine same in place during cracking. The concave surfaces 20 may be formed on a radius as when formed by a spherical grinding element.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. In a nutcracker having a frame with parallel guides, a wedge entrained on said guides, a threaded shaft carried by said frame for advancing said wedge into a nut to be cracked, the improvement comprising:

downwardly convergent surfaces on said frame for supporting a nut of oblong shape, each said convergent surface being in a separate inclined plane, the inclined planes defining an included angle of approximately 130 degrees, a spherical recess formed in each of said convergent surfaces, and each of said recesses having a concave wall surface for supporting a nut of spheroidal shape.

* * * * *